Feb. 7, 1928.
E. P. KING
LEVEL SIGHT
Original Filed Nov. 23, 1925
1,658,528
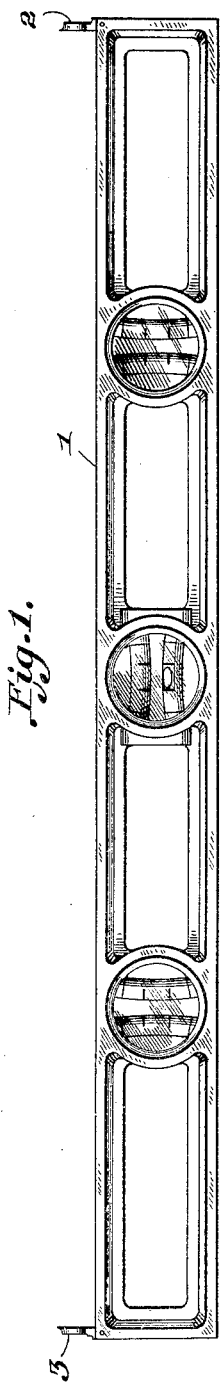
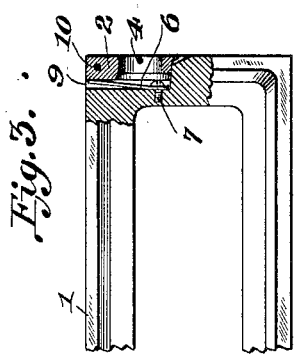
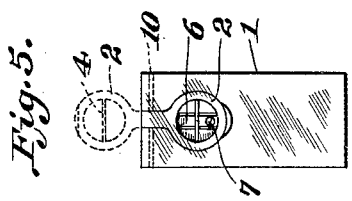
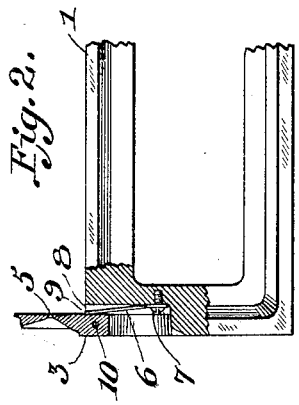
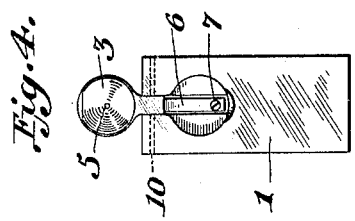
Inventor
*Edward P. King*
By *Mason Fenwick Lawrence*
Attorneys Patented Feb. 7, 1928.

1,658,528

UNITED STATES PATENT OFFICE.

EDWARD P. KING, OF CHICAGO, ILLINOIS, ASSIGNOR TO SANDS LEVEL & TOOL COMPANY, OF DETROIT, MICHIGAN.

LEVEL SIGHT.

Application filed November 23, 1925, Serial No. 70,900. Renewed December 31, 1927.

This invention relates to improvements in level sights, particularly in sights adapted for use with spirit levels.

An object of this invention is to provide means for folding the sights into suitable grooves formed in the framework of the level.

A further object of this invention is to provide means for holding the sight in an open and closed position under tension.

Other objects will appear from the following detailed description, and from the single sheet of drawings herewith made a part of this application.

In the drawings:

Fig. 1 represents a side elevational view of the level, showing the sights in raised position.

Fig. 2 illustrates a side elevational view of one end of the level with a portion in section disclosing the sight in a raised position, and the tensioned means for retaining the sight in position.

Fig. 3 represents a side elevational view of an end of the level with a portion in section disclosing the sight in a closed position, and the tensioned means for retaining the sight in position.

Fig. 4 illustrates an end elevational view of the level with the sight in raised relationship thereto.

Fig. 5 represents Fig. 4 with the sight in closed relationship thereto.

Numeral 1 designates a level of the spirit level type, although it is to be understood that this application is not to be confined to any specific type of level. The level 1 is adapted to be provided at each end with sights 2 and 3, the sights 2 being supplied with the usual cross hair 4, and sight 3 with eye opening 5.

Numeral 6 designates a tension spring fastened at one end to the level by a screw 7, or otherwise, at the lower end of a groove 8 adapted to receive the tension spring 6. The other end of the tension spring 6 as at 9 is adapted to swing free and hold the sights 2 and 3 under tension in their open or closed positions. The sights 2 and 3 are rotatably mounted in the level by means of pins 10.

This invention provides a level having sights adapted to fold into suitable grooves located in the end surfaces of the level frame. The construction in this invention relieves the longitudinal upper and lower surfaces of the level from any objectionable obstructions, or depressions in the instrument surfaces. Furthermore, the sights in this invention are combined with a tension in such a manner that they are held in rigid relationship to the level either in closed or open position.

What I claim is:—

A level having a straight side with ends at right angles thereto, said ends having circular recesses therein spaced below said side, and having slots extending from said recesses through said side, a sight having a circular sighting part adapted to fit flush into said recess and having a part connected to said sighting part provided with parallel flat sides and pivoted in said slot, and a leaf spring secured at one end to said level in such recess with its other end engaging one or the other of said flat parallel sides to hold the sight either projecting from said straight side, or hold it flush with said recess.

In testimony whereof I affix my signature,

EDWARD P. KING.